TOY CAR

Original Filed Aug. 19, 1968 2 Sheets-Sheet 1

TOY CAR

Original Filed Aug. 19, 1968 2 Sheets-Sheet 2

United States Patent Office

Re. 27,859
Reissued Jan. 1, 1974

27,859
TOY CAR

Keiichiro Miura, Tokyo, Japan, assignor to Asahi Toy Co., Ltd., Tokyo, Japan

Original No. 3,541,725, dated Nov. 24, 1970, Ser. No. 753,670, Aug. 19, 1968. Application for reissue Apr. 25, 1972, Ser. No. 247,388
Int. Cl. A63h *17/00*
U.S. Cl. 46—206 10 Claims

Matter enclosed in heavy brackets [ ] appears in the original patent but forms no part of this reissue specification; matter printed in italics indicates the additions made by reissue.

ABSTRACT OF THE DISCLOSURE

A toy car moved by a repulsive force of spiral spring. The spiral spring is wound by pressing the car downwardly and moving it forwardly, thereby making a gear provided on a driving shaft drive a gear which is connected to an end of the spiral spring through another shaft. The repulsive force of the wound spiral spring is transmitted to driving wheels by means of a gear train.

The present invention relates to a toy car and more particularly to such toy car which is driven by the force of a spiral spring.

An object of the present invention is to provide a toy car in which winding of the spiral spring, which is the power source, is effected through gears pivoted to a driving wheel shaft by pressing the car body downwardly and the force of the wound up spiral spring is again transmitted back to the driving wheels through a combination of a plurality of cogwheels to thereby make the car run.

It is another object of the present invention to provide a toy car of the type described, in which winding of the spiral spring and transmission of the spring force to the driving wheel shaft are smoothly and securely conducted through a combination of cogwheels and in which gear ratio of the cogwheels is suitably arranged to permit long time use of the accumulated force of the spiral spring and running of the car always at an appropriate speed.

It is still another object of the present invention to provide a toy car which is easy to operate, makes no noise during operation and has a driving mechanism which is hard to break since it is made up of a simple combination of gears and a spiral spring.

The various objects, features and advantages of the invention will appear more fully from the detailed description which follows, taken in connection with the accompanying drawings forming a part of this application, in which.

Figure 1:
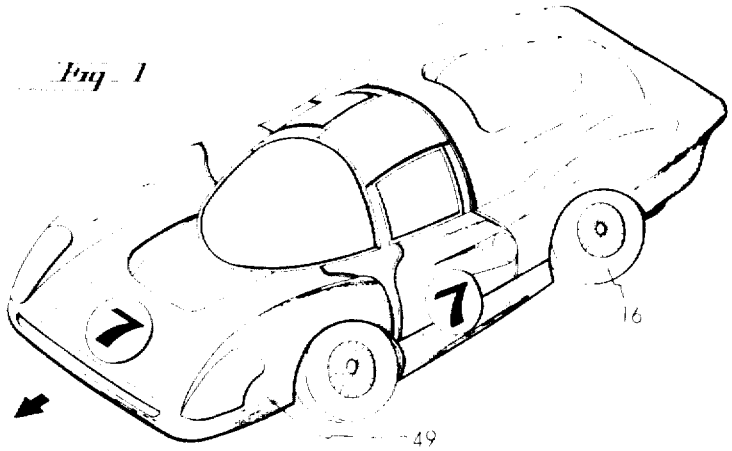
FIG. 1 is a perspective view of a completed toy car according to the present invention.

Now, the invention will be more fully described by way of an embodiment with reference to the drawings. As will be obvious from FIGS. 1 and 2, the toy car of the present invention comprises a main body 49 and a chassis 50 which are both preferably made of synthetic resin or metal sheet shaped suitably. At the four corners of the chassis 50 are erected struts 56, 57, 58 and 59 and also provided the front wheels and the rear wheels 15, 16 connected to the driving assembly 55.

Figure 2:
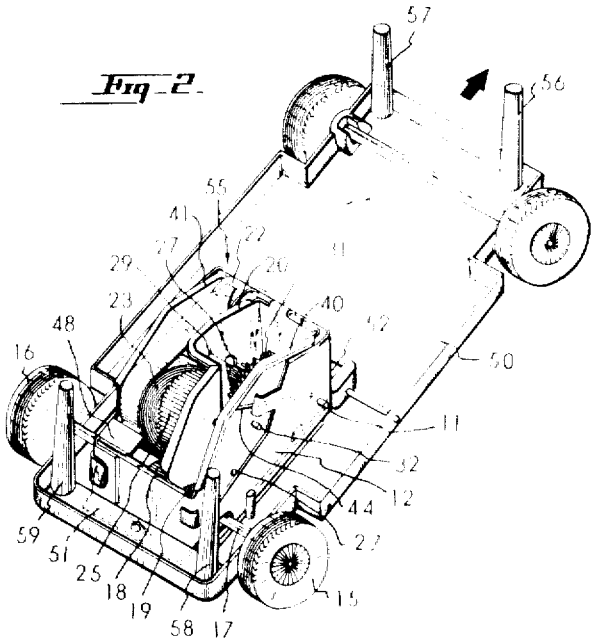
FIG. 2 is a perspective view of the car with its body frame removed.

The struts 56, 57, 58 and 59 serve as supports when the car body is pressed downwardly to wind the spiral spring which is the power source of the present toy car. The upper ends of said struts are secured to the upper inside face of the body 49 by means of an adhesive, and also the inside of the side portion of the body 49 and the outside of the side portion of the chassis 50 are bound together by an adhesive or other means to integrally assemble the body 49 and the chassis 50 to thereby form a finished car such as shown in FIG. 1.

The running gear assembly of the present invention, which is generally shown by a numeral 55 in the figures, is housed in a rectangular frame 21 and a U-shaped bearing member 12. The frame also includes frame 21 and bearing member 12 are a central bent bearing plate 20 and is secured to the chassis 50 by suitable means. In the present invention, the frame 21 is provided with flanges 51, 52, said flange 51 being inserted into a slot formed in the chassis 50 while the flange 52 being inserted between the guide projection, with a shaft being provided to position between said projections to thereby secure said flange (see FIGS. 2, 3, 8 and 9). It will be obvious that the securing method of the running gear assembly 55 is not limited to the particular method used in the present invention, but various other modified methods may be utilized.

Figure 6:
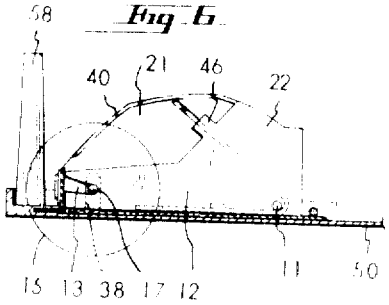
FIG. 6 is a side view showing a combined condition of the bearing and the frame of the driving assembly during operation and stoppage thereof.
Figure 7:
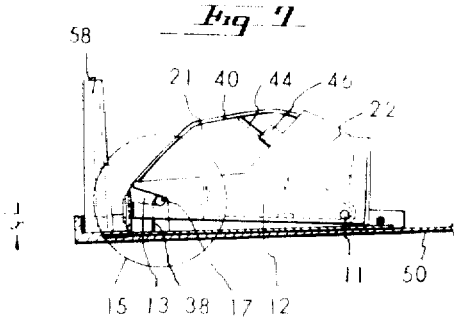
FIG. 7 is a side view showing a combined condition of said bearing and frame when the spring is wound up.
Figure 8:
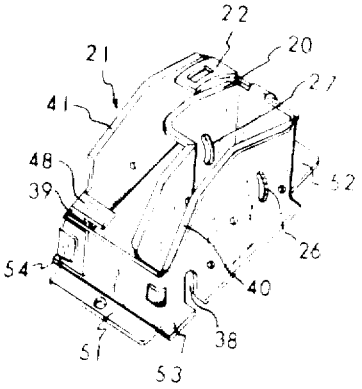
FIG. 8 is a perspective view of the body frame.
Figure 9:
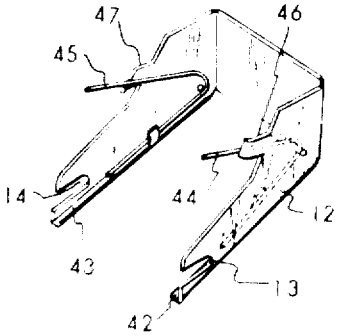
FIG. 9 is a perspective view of the bearing means.

Here, the composition of the running gear assembly 55 will be discussed in more detail. At the ends of the box-like U-shaped bearing 12 are formed slots 13, 14 in which is received a wheel shaft 17 having wheels 15, 16 secured at both ends thereof. Mounted on said shaft 17 and between said wheels 15, 16 are cogwheels 18, 19. (See FIGS. 6, 7 and 9.)

It will also be noted that a shaft 24 is passed transversely across the frame 21 having fitted in its center the bearing plate 20 which is bent in the middle thereof. To said shaft 24 is secured one end of a spiral spring 23 of which the other end is fixed to a clasp 22 formed by bending a part of the frame 21. There is also mounted on said shaft 24 a cogwheel 25 which synchronizes with the spiral spring 23 (see FIG. 3).

There are formed arcuate slots 26, 27 in which a shaft 28 is inserted so as to be vertically movable along the cogwheel 25. On said shaft 28 is mounted a two-stage gear 31 composed of a small-diameter cogwheel 29 and a large-diameter cogwheel 30 in such manner that the small-diameter cogwheel 29 always stays meshed with the cogwheel 25 (see FIG. 3).

Figure 3:
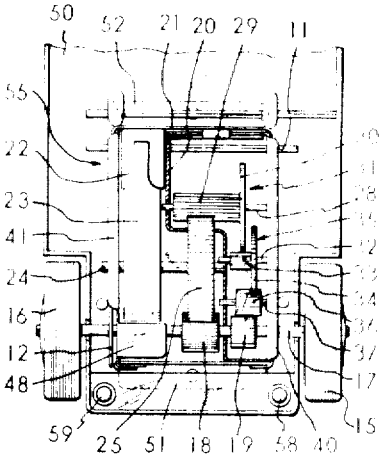
FIG. 3 is a plane view of the driving assembly mounted on the chassis.

As will best be seen in FIG. 3, there is provided a shaft 32 on which is mounted another two-stage gear 35 comprising a small-diameter cogwheel 33 and a large-diameter cogwheel 34 and which is arranged so that said small-diameter cogwheel 33 is meshed with the large-diameter cogwheel 30 of the two-stage gear 31 when said vertically movable shaft 28 descended to its lower limit.

There is also provided a shaft 37 on which is mounted a cogwheel 36 meshing with the large-diameter cogwheel 34 of the two-stage gear 35 fitted on said fixed shaft 32, thus completing the driving system in the frame 21.

The bearing member 12 of the wheel shaft 17 is of a box-like clip-shaped configuration and combined with the frame 21 in such manner as to hold said frame therein. The slots 13, 14 in the bearing member 12 are aligned with the oblique slots 38, 38 formed at the bottom edges of the frame 21 to pass the wheel shaft 17 therethrough, and at the opposite side of said wheel shaft 17 is passed a shaft 11 which integrally combines the bearing member 12 and the frame 21 so that said member 12 and said frame 21 may be rotated over an angle about said shaft 11. The cogwheel 17 on the wheel shaft 17 is always meshed with the cogwheel 36 of said fixed shaft 37. The cogwheel 18 is left unmeshed while the car is running or at a stop, but is meshed with the cogwheel 25 fixed on the shaft 24 when the frame 21 is lowered to wind the spiral spring 23.

In the inside of the bearing member 12 are provided V-shaped springs 44, 45 which have upper legs engaged at one end with the upper edges 40, 41 of the frame 21 and lower legs engaged with the lower edges 42, 43 of the bearing 12. The bearing 12 is pressed downward to let the wheel shaft 17 normally position at the lowermost ends of the oblique slots 38, 39 in the frame 21. Projections 46, 47 at upper parts of the bearing member 12 are provided for the purpose of inhibiting the springs 44, 45 from coming off outwardly.

At the opposite side of the spiral spring clasp 22 formed by bending an upper edge of the frame 21, there is provided a stopper 48 formed by bending a part of the frame 21 for preventing over wind-back of the spiral spring 23. At both bottom ends in the lengthwise direction are provided flanges 51, 52 for mounting the chassis 50. Also, at both sides of the bottom of the frame 21 re provided flanges 53, 54 for mounting purpose.

Figure 5:
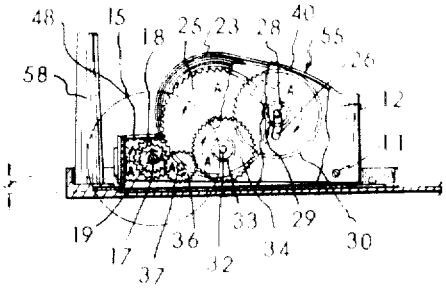
FIG. 5 is a partly broken away side view showing a condition in which the spring of the driving assembly is wound up.

Now the operational aspect of the present invention, which has the above-described construction, will be discussed. When the body 49 is pressed down, the frame 21 supported by the shaft 11 is lowered with the chassis 50, and the bearing 12 and the frame 21 are opened from each other over an angle of centering about the shaft 11, causing the cogwheel 25 to mesh with the cogwheel 18. Then the body 49, while being pressed down, is pushed in the running direction to rotate the wheels 15, 16, which rotation (in the direction indicated by arrow marks A) is received by the cogwheel 18 and further transmitted through the cogwheel 25 to the shaft 24 to rotate it to thereby wind the spiral spring 23, whereby the two-stage gear 31 on the vertically movable shaft 28 is pulled up through the small-diameter cogwheel 29 by the cogwheel 25 mounted on the shaft 24, causing disengagement of the large-diameter cogwheel 30 from the small-diameter cogwheel 33 of the two-stage gear 35 (see FIGS. 5 and 7).

On the other hand, the cogwheel 36 on the shaft 37 and the large-diameter cogwheel 34 of the two-stage gear 35 are always kept in a meshed conditions, so that the rotation of the wheel shaft 17 causes the corresponding rotation of the cogwheels in the A-arrow-marked direction. However, since the cogwheel 30 and the cogwheel 33 are disengaged from each other as described above, backlash of the cogwheel is not conveyed.

Figure 4:
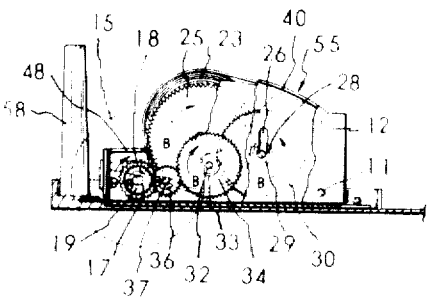
FIG. 4 is a partly cut away side view showing the meshing engagement of the gears during operation and stoppage of the driving mechanism.

When pressing on the body 49 is released, the frame 21 is forced back upward with the chassis 50 by the force of the spring 44, causing the cogwheel 18 on the wheel shaft 17 to disengage from the cogwheel 25. Thus, the springing-back force of the spiral spring 23 urges the cogwheel 25 to rotate in the direction indicated by the arrow marks B and to push downward the small-diameter cogwheel 29 of the two-stage gear 31, causing the large-diameter cogwheel 30 to mesh with the small-diameter cogwheel 33 of the two-stage gear 35 on the fixed shaft 32, whereby the rotating force is transmitted through the cogwheel 34 to cause the cogwheel 36 and the cogwheel 19 on the wheel shaft 17 to rotate in the B-arrow-marked direction, thus rotating the wheel shaft 17 and allowing the car to run forward. (See FIGS. 4 and 6).

As viewed above, according to the present invention, vertical movement of the two-stage gear 31 pivoted to the vertically movable shaft 28, winding of the spiral spring 23 by engagement and disengagement of the cogwheels 18 and 19 on the wheel shaft 17, and transmission of the spring force to the wheel shaft 17 are all smoothly and securely effected through a combination of the cogwheels. Also, by suitably arranging the gear ratio of the cogwheels, it is possible to let the spiral spring 23 work its force for a long time at an appropriate speed.

While the present invention has been described with reference to a particular embodiment thereof, it will be understood that the invention is not limited thereto and it is intended by the appended claims to cover all such modifications as come within the true spirit and scope of the invention.

What is claimed is:

1. A toy car, comprising a chassis supporting a bearing member and a frame, said frame having an internal bearing plate disposed between opposite lateral sides thereof; said frame and bearing member being pivotally attached to each other at one end thereof; with the frame inside the bearing member; spring means tending to urge the frame and bearing member apart, a first shaft extending between one side of said frame and said bearing plate; a first cogwheel and a spiral spring mounted on said first shaft and located inside said frame; a second shaft vertically movable between upper and lower positions, said second shaft having fixed thereon a first two-stage gear comprising a large-diameter second cogwheel and a small-diameter third cogwheel, said third cogwheel being always meshed with said first cogwheel; a third shaft having fixed thereon a second two-stage gear comprising a large-diameter fourth cogwheel and a small-diameter fifth cogwheel, said fifth cogwheel being meshed with the large-diameter second cogwheel only when the vertically movable second shaft is in its lower position; a fourth shaft having a sixth cogwheel thereon which is always meshed with said large-diameter fourth cogwheel on said third shaft; a fifth shaft; wheels secured at both ends of the fifth shaft which is inserted through said bearing member; a seventh cogwheel; and an eighth cogwheel, said seventh and eight cogwheels being mounted on said fifth shaft between said wheels, said frame having slots in the lateral sides thereof, said fifth shaft being vertically movable in said slots, said seventh cogwheel being always meshed with the sixth cogwheel on the fourth shaft, said eighth cogwheel being meshed with the first cogwheel when the frame is lowered against tension in said spring means, while said second shaft rises to its upper position to disengage the second and fifth cogwheels.

2. A toy car as defined in claim 1, wherein said frame is generally rectangular and has front and rear sides integral with said lateral sides, and further comprising a clasp engaging one end of the spiral spring at the upper edge of the front side of the frame; a stopper element on the frame for preventing over reverse-winding of the spiral spring located adjacent to the rear side; said frame being formed with retainer means for said spring means at upper edges of said lateral sides; and flanges for mounting said frame in the chassis, said flanges being formed by bending bottom edges of all four sides of the frame, said bearing plate and the other lateral side of said frame having other slots formed therein, said second shaft being engaged in said other slots for vertical movement therein.

3. A toy car as defined in claim 1, wherein said bearing member is generally U-shaped with a pair of parallel side walls, said spring means being V-shaped springs, said side walls of the bearing member having bent bottom edges for retaining lower legs of said V-shaped springs; projections formed at upper edges of said side walls for retaining upper legs of said V-shaped springs, and further slots formed in said side walls for receiving said fifth shaft.

4. A toy car as defined in claim 1, further comprising struts erected at corners of the chassis for mounting a car body thereon.

5. A driving assembly for a toy car, comprising a chassis supporting a bearing member and a frame, said frame having an internal bearing plate disposed between opposite lateral sides thereof; said frame and bearing member being pivotally attached to each other at one end thereof; with the frame inside the bearing member; spring means tending to urge the frame and bearing member apart; a first shaft extending between one side of said frame and said bearing plate; a first cogwheel and a spiral spring mounted on said first shaft and located inside said frame; a second shaft vertically movable between upper and lower positions, said second shaft having fixed thereon a first two-stage gear comprising a large-diameter second cogwheel and a small-diameter third cogwheel, said third cogwheel being always meshed with said first cogwheel; a third shaft having fixed thereon a second two-stage gear comprising a large-diameter fourth cogwheel and a small-diameter fifth cogwheel, said fifth cogwheel being meshed with the large-diameter second cogwheel only when the vertically movable second shaft is in its lower position; a fourth shaft having a sixth cogwheel thereon which is always meshed with said large-diameter fourth cogwheel on said third shaft; a fifth shaft; wheels secured at both ends of the fifth shaft which is inserted through said bearing member; a seventh cogwheel; and an eighth cogwheel, said seventh and eighth cogwheels being mounted on said fifth shaft between said wheels, said frame having slots in the lateral sides thereof, said fifth shaft being vertically movable in said slots, said seventh cogwheel being always meshed with the sixth cogwheel on the fourth shaft, said eighth cogwheel being meshed with the first cogwheel when the frame is lowered against tension in said spring means, while said second shaft rises to its upper position to disengage the second and fifth cogwheels.

6. A driving assembly for a toy car as defined in claim 5, wherein said frame is generally rectangular and has front and rear sides integral with said lateral sides, and further comprising a clasp engaging one end of the spiral spring at the upper edge of the front side of the frame; a stopper element on the frame for preventing over reverse-winding of the spiral spring located adjacent to the rear side; said frame being formed with retainer means for said spring means at upper edges of said lateral sides; and flanges for mounting said frame in the chassis, said flanges being formed by bending bottom edges of all four sides of the frame, said bearing plate and the other lateral side of said frame having other slots formed therein, said second shaft being engaged in said other slots for vertical movement therein, said bearing plate and the other lateral side of said frame having other slots formed therein, said second shaft being engaged in said other slots for vertical movement therein.

7. A toy car as defined in claim 6, wherein said bearing member is generally U-shaped with a pair of parallel side walls, said spring means being V-shaped springs, said side walls of the bearing member having bent bottom edges for retaining lower legs of said V-shaped springs; projections formed at upper edges of said side walls for retaining upper legs of said V-shaped springs, and further slots formed in said side walls for receiving said fifth shaft.

*8. A driving assembly for a toy car, comprising:*

*a driving shaft having at least one gear mounted on the central portion thereof;*

*a spiral spring having one end thereof fixedly secured with respect to said driving assembly and the other end thereof secured to a shaft having a second gear mounted thereon such that rotation of said second gear and associated shaft in a first direction causes winding of said spiral spring and rotation in a second opposite direction results from unwinding of said spiral spring; and*

*a gear train intermediate said one gear and said second gear;*

*said one gear and said second gear being aligned and in engagement for winding said spiral spring and being disengaged as said spiral spring is being unwound.*

*9. A driving assembly for a toy car, as set forth in claim 8 wherein said gear train is always in engagement with said driving shaft when said spiral spring is wound.*

*10. A driving assembly for a toy car, as set forth in claim 8, wherein said spiral spring is only interconnected with said driving shaft only auring winding and unwinding of said spiral spring.*

References Cited

The following references, cited by the Examiner, are of record in the patented file of this patent or the original patent.

UNITED STATES PATENTS

| | | | |
|---|---|---|---|
| 2,590,515 | 3/1952 | Derham | 46—206 |

FOREIGN PATENTS

| | | | |
|---|---|---|---|
| 913,510 | 3/1954 | Germany. | |
| 715,303 | 9/1959 | Great Britain. | |
| 1,394,867 | 3/1965 | France. | |
| 470,479 | 8/1937 | Great Britain | 46—206 |

ROBERT F. CUTTING, Primary Examiner